US012050422B2

(12) United States Patent
Uehara et al.

(10) Patent No.: US 12,050,422 B2
(45) Date of Patent: Jul. 30, 2024

(54) FIXING DEVICE AND IMAGE FORMING APPARATUS

(71) Applicant: KYOCERA Document Solutions Inc., Osaka (JP)

(72) Inventors: Masakazu Uehara, Osaka (JP); Hironori Takahashi, Osaka (JP); Tomohiro Watatani, Osaka (JP); Shota Onishi, Osaka (JP); Yuhiro Sakai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/162,888

(22) Filed: Feb. 1, 2023

(65) Prior Publication Data

US 2023/0244169 A1 Aug. 3, 2023

(30) Foreign Application Priority Data

Feb. 3, 2022 (JP) ................................. 2022-015398

(51) Int. Cl.
*G03G 15/20* (2006.01)
*G03G 21/16* (2006.01)

(52) U.S. Cl.
CPC ..... *G03G 15/2064* (2013.01); *G03G 21/1647* (2013.01); *G03G 21/1685* (2013.01)

(58) Field of Classification Search
CPC ........... G03G 15/2064; G03G 21/1647; G03G 21/1685; G03G 2215/2035; G03G 15/2053
See application file for complete search history.

(56) References Cited

U.S. PATENT DOCUMENTS

2012/0308279 A1* 12/2012 Tanaka ............... G03G 15/2053 399/329
2018/0203390 A1 7/2018 Honke et al.
2019/0004459 A1* 1/2019 Sekiyama .......... G03G 15/2053
2019/0391513 A1* 12/2019 Toratani ............. G03G 15/2053
2022/0291610 A1* 9/2022 Seki .................. G03G 21/1647

FOREIGN PATENT DOCUMENTS

JP 6493891 B2 4/2019

* cited by examiner

*Primary Examiner* — Sandra Brase
(74) *Attorney, Agent, or Firm* — Alleman Hall & Tuttle LLP

(57) ABSTRACT

Provided is a fixing device including: a fixing belt; a pressure roller which pressurizes toner on a sheet that passes through a pressure area; a pair of retention members each including a shaft-supporting portion which rotatably guides one of both end portions of the fixing belt in an axial direction, and a restriction surface which restricts a movement of the fixing belt in the axial direction; and a frame including a pair of side plates which rotatably support both end portions of the pressure roller in the axial direction as well as support the fixing belt via the pair of retention members, in which attachment positions of the pair of retention members in the pair of side plates are provided such that a gap becomes larger on a downstream side of a passing direction of the sheet with respect to the pressure area than on an upstream side.

5 Claims, 10 Drawing Sheets

FIXING DEVICE AND IMAGE FORMING APPARATUS

INCORPORATION BY REFERENCE

This application is based upon and claims the benefit of priority from the corresponding Japanese Patent Application No. 2022-015398 filed on Feb. 3, 2022, the entire contents of which are incorporated herein by reference.

BACKGROUND

The present disclosure relates to a fixing device which fixes a toner image on a medium, and an image forming apparatus.

A fixing device including a film and a pressure roller which comes into contact with the film and forms a nip portion is known. At both end portions of the film in a longitudinal direction, a pair of restriction members each including a restriction surface and a guide surface are attached. The restriction surface restricts a movement of the film in the longitudinal direction. The guide surface guides an inner circumferential surface of the film.

For example, when there is a difference in rotation speed between the both end portions of the film in the longitudinal direction, the film tilts such that a portion of the film on a side with a higher rotation speed is deviated toward a downstream side of a conveying direction of a recording member. In this case, there is a fear that the inner circumferential surface of the film will be set apart from the guide surface of one of the pair of restriction members. When the end portion of the film in the longitudinal direction comes into contact with the restriction surface in a state where the inner circumferential surface of the film is set apart from the guide surface, a situation where the end portion of the film is damaged due to bending or the like has occurred.

For example, in a conventional apparatus, lower portions of the restriction surface on the upstream side and downstream side of the conveying direction include a tilted surface that is tilted in a direction of being set apart from the end portion of the film in the longitudinal direction. Thus, it becomes difficult for the end portion of the film in the longitudinal direction to come into contact with the restriction surface.

However, in the conventional apparatus, the tilt of the restriction members has not been considered at all.

For example, on both sides of the film in the longitudinal direction, the pair of restriction members may be attached in an attitude in which the pair of restriction members are tilted so as to approach each other from the upstream side of the conveying direction toward the downstream side. In this case, even when the lower portions of the restriction surface include the tilted surface, it becomes easy for the end portion of the film to come into contact with the restriction surface.

Therefore, a situation where, even when the restriction surface includes the tilted surface, the damage of the end portion of the film cannot be suppressed has occurred.

SUMMARY

A fixing device according to an aspect of the present disclosure includes a fixing member, a pressure member, a pair of retention members, and a frame. The fixing member has flexibility, is formed in a cylindrical shape extending in an axial direction, and heats a toner image on a medium while rotating. The pressure member forms a pressure area between the pressure member and the fixing member while rotating, and pressurizes toner on the medium that passes through the pressure area. The pair of retention members each include a shaft-supporting portion and a restriction surface. The shaft-supporting portion rotatably guides one of both end portions of the fixing member in the axial direction. The restriction surface opposes the end portion of the fixing member in the axial direction and restricts a movement of the fixing member in the axial direction. The frame includes a pair of side plates to which the pair of retention members are attached and which rotatably support both end portions of the pressure member in the axial direction as well as support the fixing member via the pair of retention members. At least portions of the pair of side plates at which the pair of retention members are attached are provided such that a gap becomes larger on a downstream side of a passing direction of the medium with respect to the pressure area than on an upstream side.

For example, the frame includes a first stay and a second stay. The first stay is bridged between the pair of side plates on the upstream side of the passing direction with respect to the portions at which the pair of retention members are attached. The second stay is formed to be longer than the first stay in the axial direction, and is bridged between the pair of side plates on the downstream side of the passing direction with respect to the portions at which the pair of retention members are attached.

For example, the portions at which the pair of retention members are attached each include a fitting groove into which a corresponding one of the pair of retention members is fit, the fitting groove being cut in from one end portion toward another end portion in each of the pair of side plates in an up-down direction intersecting with the axial direction and the passing direction. The first stay is provided more on the upstream side of the passing direction than the fitting groove, and the second stay is provided more on the downstream side of the passing direction than the fitting groove.

For example, the portions at which the pair of retention members are attached each include a fitting groove into which a corresponding one of the pair of retention members is fit, the fitting groove being cut in from one end portion toward another end portion in each of the pair of side plates in an up-down direction intersecting with the axial direction and the passing direction. The frame includes a connection plate bridged between one end portions of the pair of side plates in the up-down direction. The connection plate connects the pair of side plates such that a gap between the pair of side plates becomes larger on the downstream side of the passing direction with respect to the fitting groove than on the upstream side.

An image forming apparatus according to another aspect of the present disclosure includes: an imaging device which forms a toner image on a medium; and the fixing device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
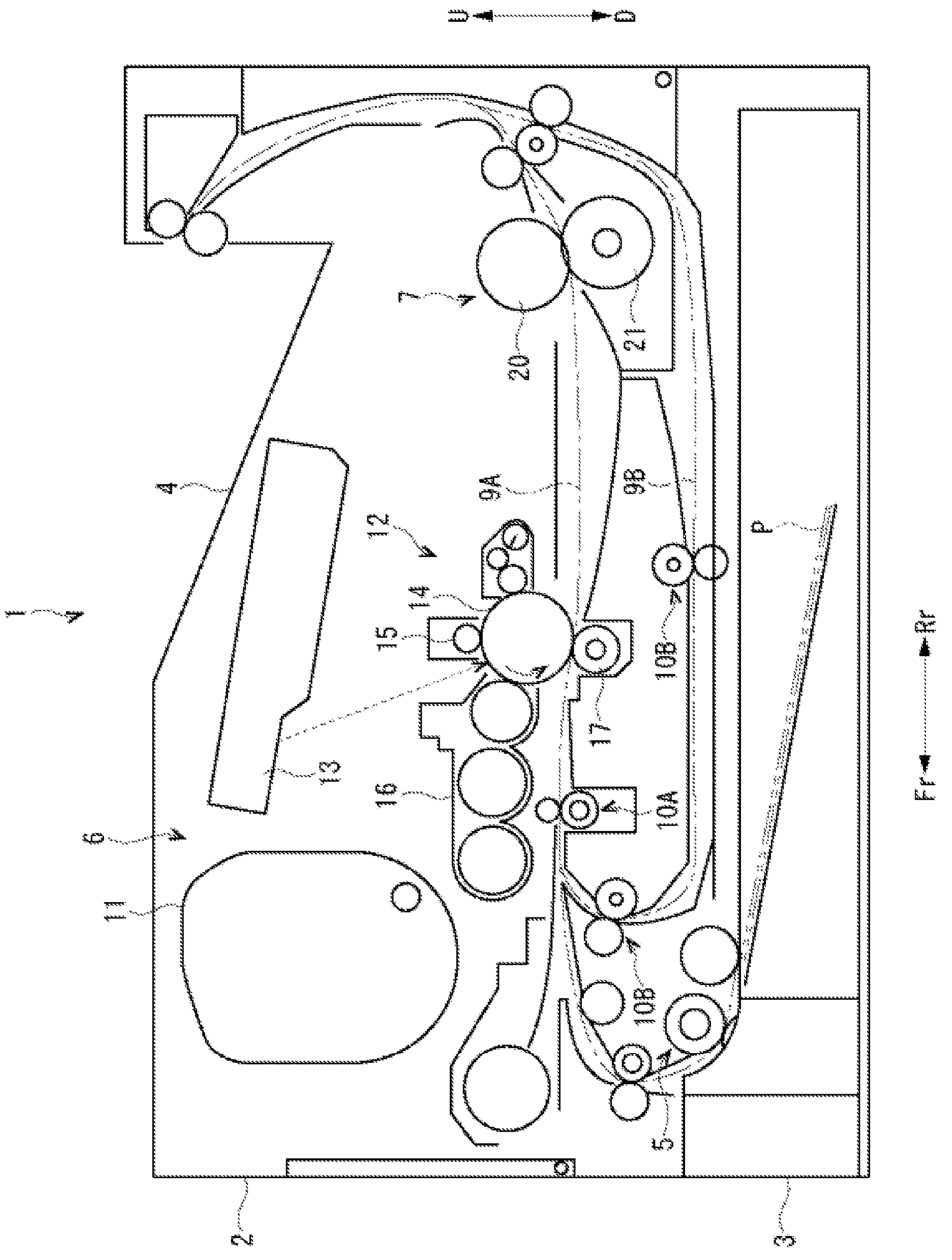
FIG. 1 is a schematic diagram (side view) showing an internal structure of an image forming apparatus according to an embodiment of the present disclosure.

Hereinafter, an embodiment of the present disclosure will be described with reference to the attached drawings. It is noted that Fr, Rr, L, R, U, and D in the drawings respectively indicate front, rear, left, right, up, and down of an image forming apparatus 1 and a fixing device 7.

In the image forming apparatus 1 and the fixing device 7, a front-rear direction, a left-right direction, and an up-down direction are orthogonal to one another. Although terms indicating directions and positions are used in the present specification, those terms are merely used for convenience of descriptions and do not limit the technical scope of the present disclosure.

In addition, "upstream", "downstream", and terms similar to these indicate "upstream", "downstream", and a concept similar to these regarding a passing direction of a sheet P in the fixing device 7. The passing direction is a conveying direction of the sheet P by the fixing device 7.

In the present embodiment, the passing direction is a direction along the front-rear direction. It is noted that in the respective figures, sizes, angles, and the like of members are not accurate and are schematically illustrated for descriptions.

With reference to FIG. 1, the image forming apparatus 1 according to the embodiment will be described. FIG. 1 is a schematic diagram (side view) showing the image forming apparatus 1.

The image forming apparatus 1 is a printer that uses electrophotography. The image forming apparatus 1 includes an apparatus body 2 constituting a substantially rectangular parallelepiped appearance.

At a lower portion of the apparatus body 2, for example, a sheet feed cassette 3 that houses a sheet P (medium) is provided detachably. A sheet discharge tray 4 is provided on an upper surface of the apparatus body 2. It is noted that the sheet P as an example of the medium is not limited to a paper sheet and may be a resin sheet and the like.

The image forming apparatus 1 includes a sheet feed device 5, an imaging device 6, and the fixing device 7. The sheet feed device 5 is provided at an upstream end portion of a conveying path 9A extending from the sheet feed cassette 3 to the sheet discharge tray 4, and feeds the sheets P housed in the sheet feed cassette 3 one by one to the conveying path 9A.

The imaging device 6 is provided at an intermediate portion of the conveying path 9A and forms a toner image on a conveyed sheet P. The fixing device 7 is provided on a downstream side of the conveying path 9A and thermally fixes the toner image onto the sheet P.

A registration roller pair 10A which temporarily blocks the conveyed sheet P and corrects a tilt of the sheet P is provided on the conveying path 9A. The correction of the tilt of the sheet P is called skew correction.

An inversion conveying path 9B is provided below the conveying path 9A. The inversion conveying path 9B branches from the conveying path 9A at a portion on the downstream side of the fixing device 7, and joins the conveying path 9A at a portion on the upstream side of the imaging device 6. A plurality of conveying roller pairs 10B for conveying the sheet P are provided on the inversion conveying path 9B.

The imaging device 6 includes a toner container 11, a drum unit 12, and a laser scanning unit 13. The toner container 11 is disposed at an upper front portion of the apparatus body 2, and stores black toner (developer), for example. The drum unit 12 includes a photoconductor drum 14, a charging device 15, a developing device 16, and a transfer roller 17.

The photoconductor drum 14 is formed in a substantially cylindrical shape, and is rotationally driven about a shaft by a motor (not shown). The charging device 15, the developing device 16, and the transfer roller 17 are arranged in an order of an image forming process around the photoconductor drum 14.

The transfer roller 17 is in contact with the photoconductor drum 14 from a lower side and forms a transfer nip. The laser scanning unit 13 is provided above the photoconductor drum 14 and emits scanning light toward a surface of the photoconductor drum 14.

[Image Forming Processing]

Operations of the image forming apparatus 1 will be described. The image forming apparatus 1 is controlled by a control apparatus (not shown), and executes image forming processing as follows based on image data input from an external terminal.

The charging device 15 charges the surface of the photoconductor drum 14. The laser scanning unit 13 emits scanning light that is based on image data, and forms an electrostatic latent image on the photoconductor drum 14. The developing device 16 develops a toner image on the photoconductor drum 14 using toner supplied from the toner container 11.

The sheet feed device 5 feeds the sheets P one by one from the sheet feed cassette 3 to the conveying path 9A. The sheet P is conveyed along the conveying path 9A, subjected to the skew correction by the registration roller pair 10A, and enters the transfer nip.

The transfer roller 17 transfers the toner image on the photoconductor drum 14 onto a surface of the sheet P that passes through the transfer nip. The fixing device 7 thermally fixes the toner image onto the sheet P. When executing one-side printing, the sheet P that has passed through the fixing device 7 is discharged to the sheet discharge tray 4.

When executing double-sided printing, the sheet P that has passed through the fixing device 7 is switched back at a downstream end portion of the conveying path 9A to be conveyed to the inversion conveying path 9B. The conveying roller pairs 10B are arranged on the inversion conveying path 9B.

The sheet P is conveyed by the conveying roller pairs 10B, conveyed back to the conveying path 9A from the inversion conveying path 9B, and conveyed to the transfer nip after being subjected to the skew correction by the registration roller pair 10A. After that, the toner image is transferred and thermally fixed onto the sheet P, and the sheet P that has been subjected to the double-sided printing is discharged to the sheet discharge tray 4.

[Fixing Device]

Figure 2:
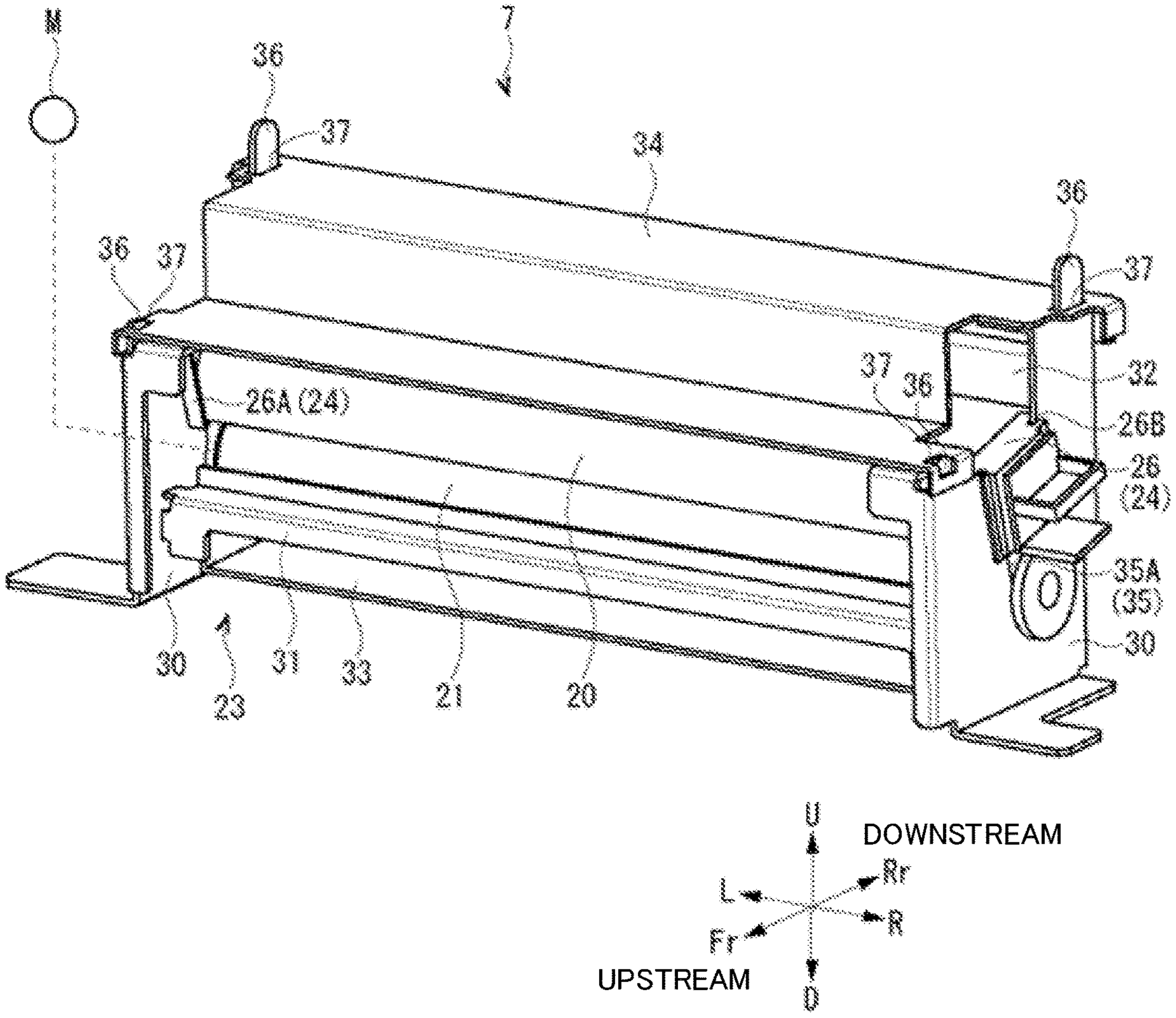
FIG. 2 is a perspective view showing a fixing device according to the embodiment of the present disclosure.
Figure 3:
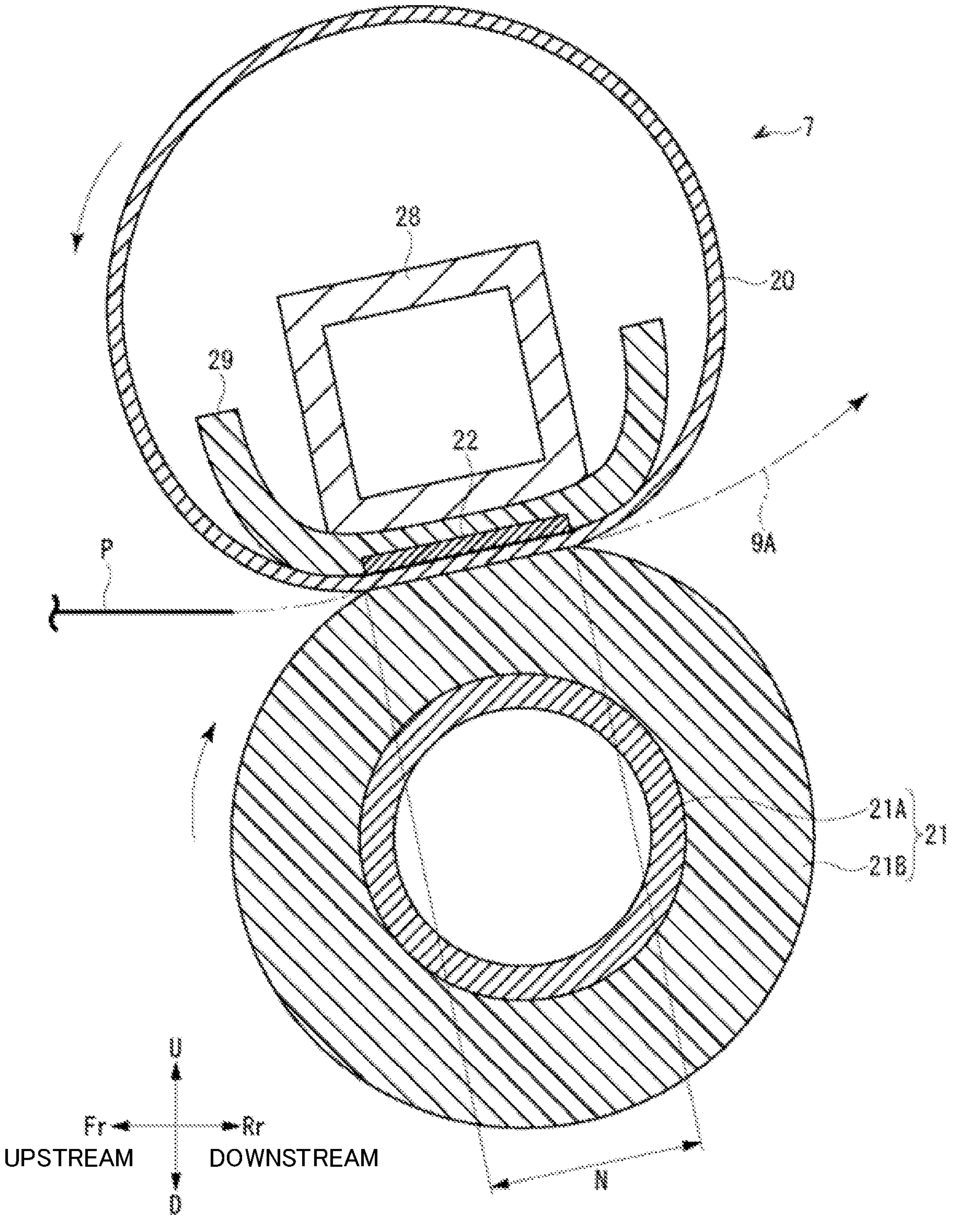
FIG. 3 is a cross-sectional view schematically showing the fixing device according to the embodiment of the present disclosure.

The fixing device 7 will be described with reference to FIG. 2 to FIG. 7. FIG. 2 is a perspective view showing the fixing device 7. FIG. 3 is a cross-sectional view schematically showing the fixing device 7.

Figure 4:
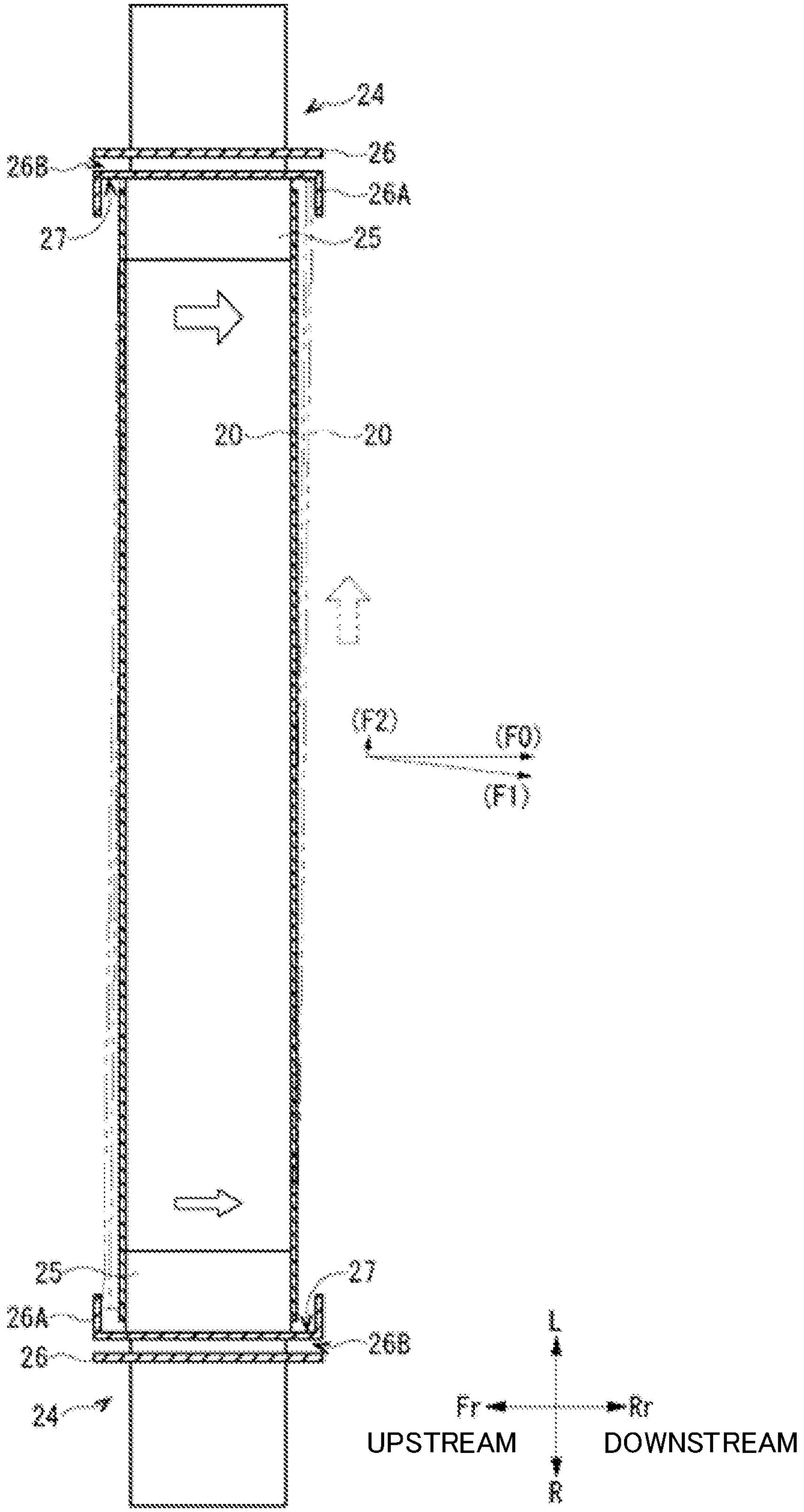
FIG. 4 is a cross-sectional view showing a fixing belt of the fixing device according to the embodiment of the present disclosure.
Figure 5:
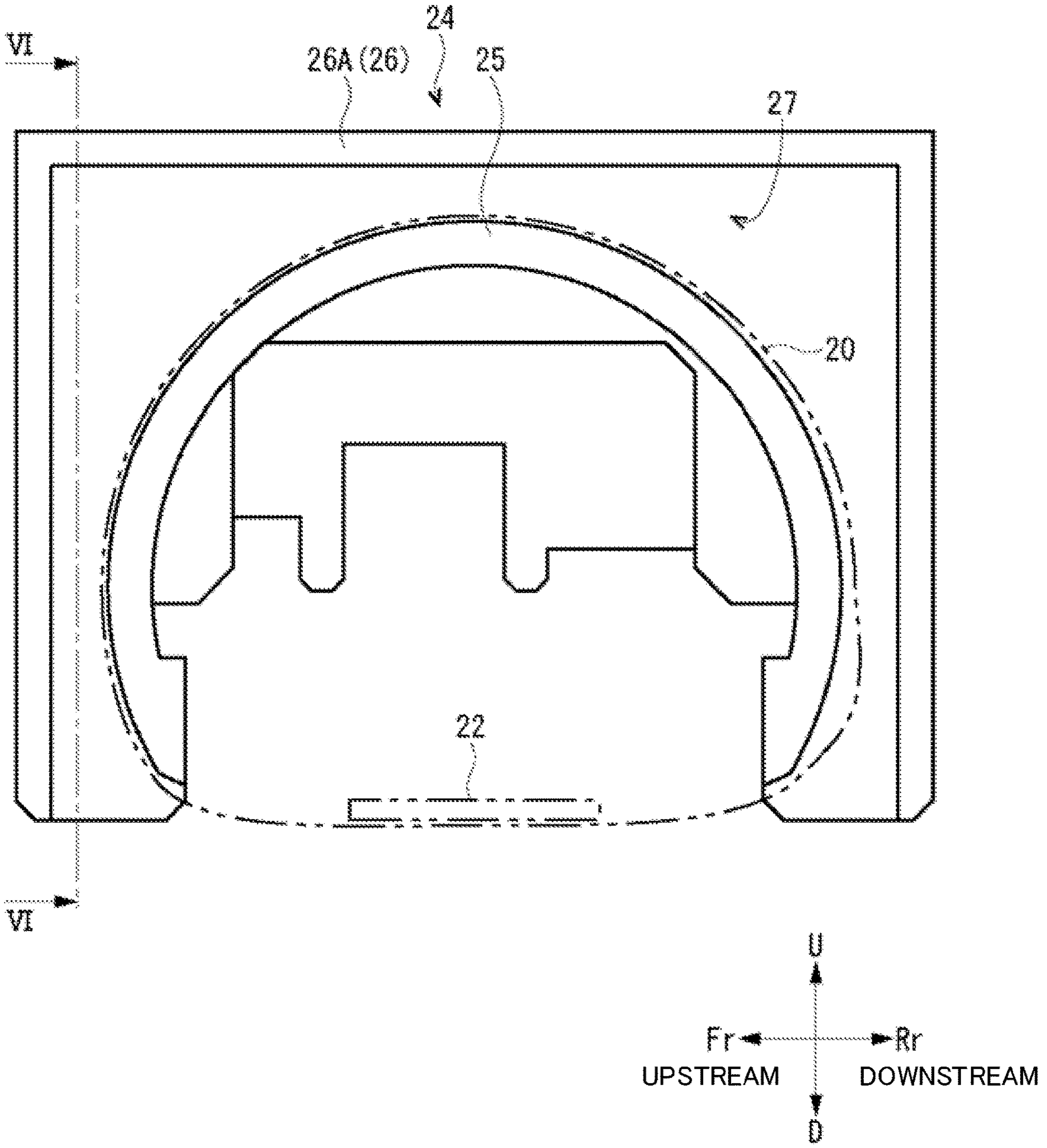
FIG. 5 is a side view showing a retention member of the fixing device according to the embodiment of the present disclosure.

FIG. 4 is a plan view (cross-sectional view) showing a fixing belt 20. FIG. 5 is a side view showing a retention member 24.

Figure 6:
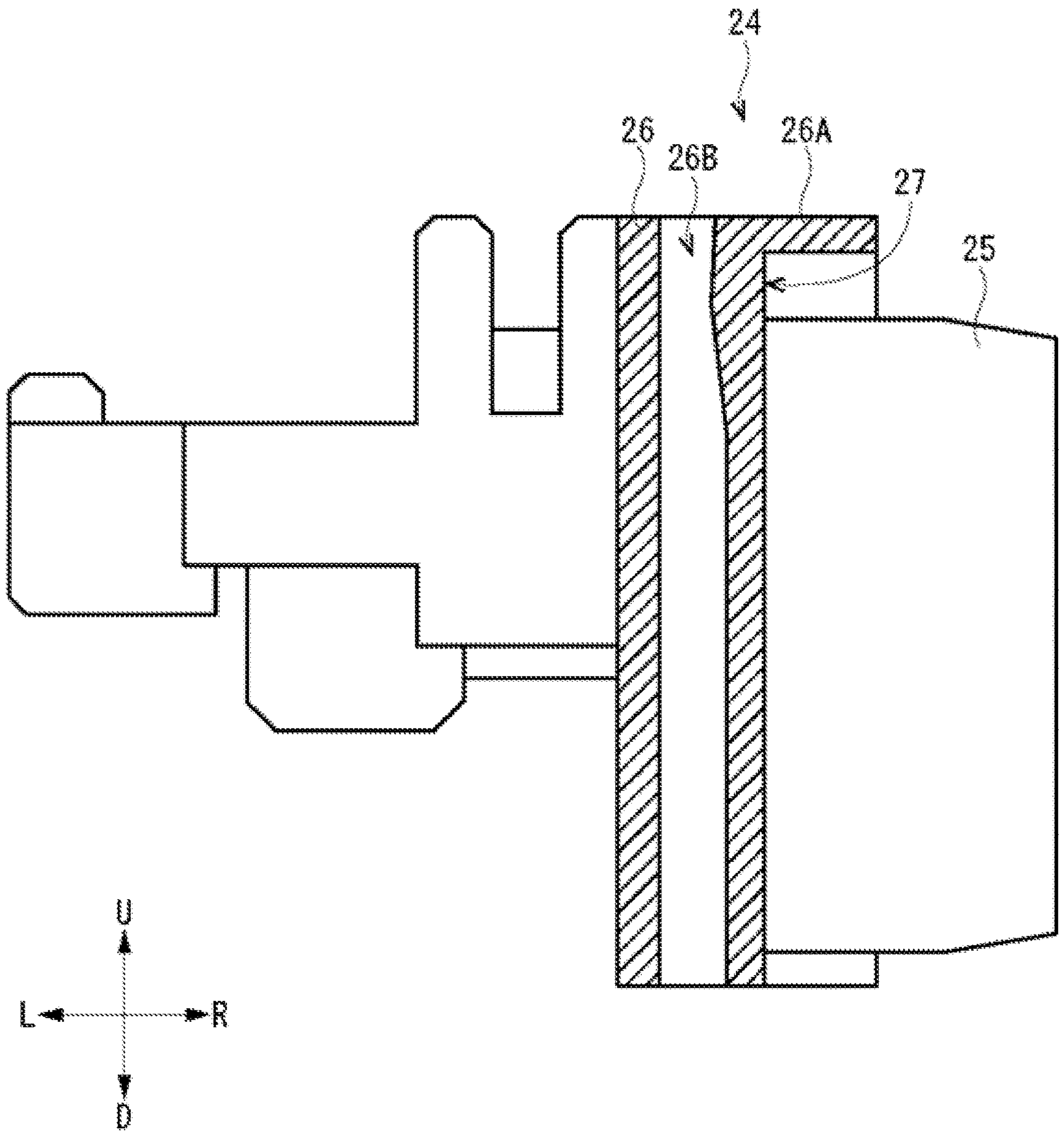
FIG. 6 is a cross-sectional view taken along the line VI-VI of FIG. 5.
Figure 7:
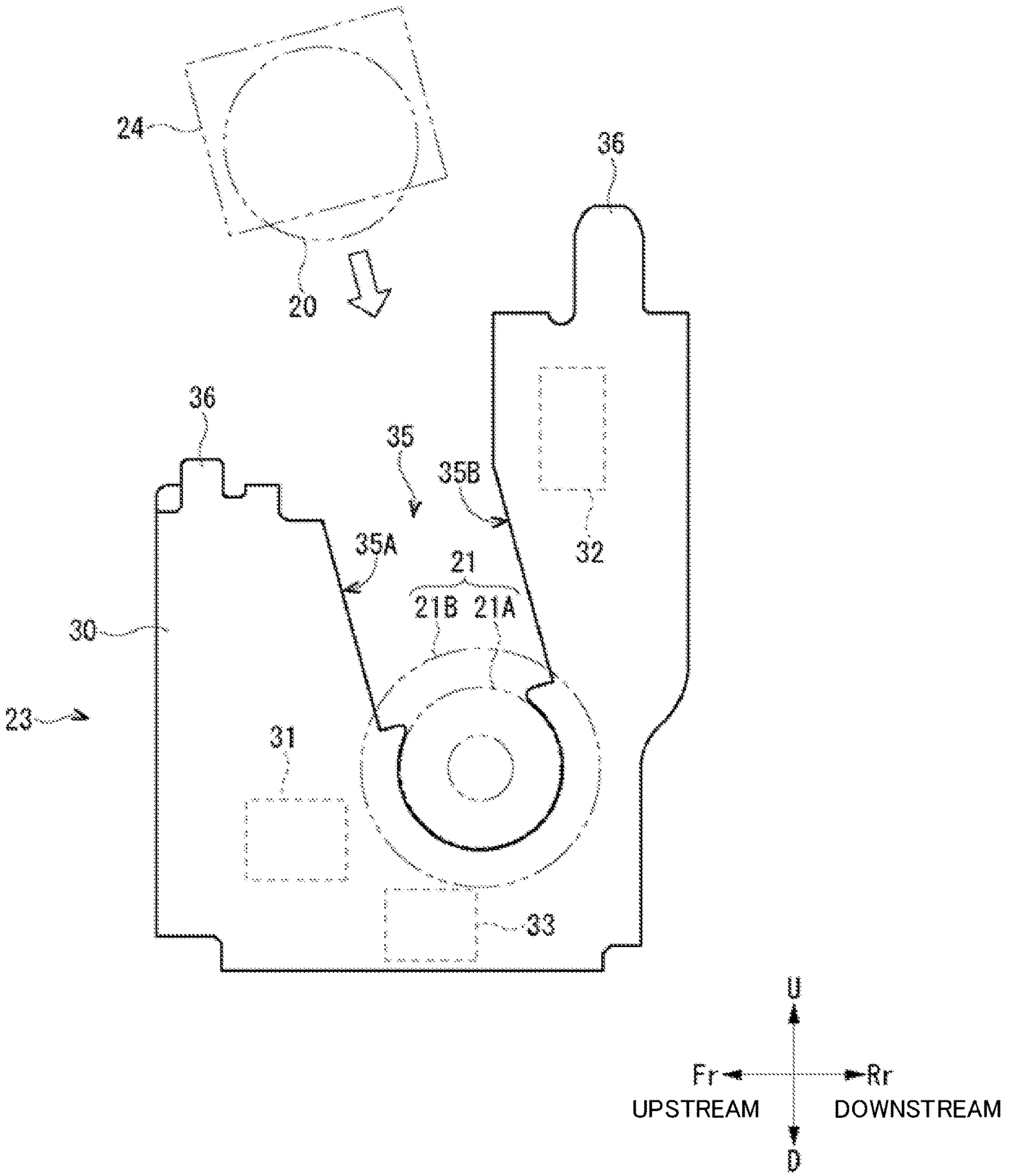
FIG. 7 is a side view showing a side plate and the like of the fixing device according to the embodiment of the present disclosure.

FIG. 6 is a cross-sectional view taken along the line VI-VI of FIG. 5. FIG. 7 is a side view showing a side plate 30 and the like.

As shown in FIG. 2 and FIG. 3, the fixing device 7 includes the fixing belt 20, a pressure roller 21, a heater 22, and a frame 23.

The fixing belt 20 and the pressure roller 21 are supported by the frame 23, and the frame 23 is fixed to the apparatus body 2. The heater 22 is provided inside the fixing belt 20.

<Fixing Belt>

The fixing belt 20 is an endless belt formed in a substantially cylindrical shape elongated in the left-right direction. The left-right direction is an axial direction of the fixing belt 20. The axial direction is the longitudinal direction of the fixing belt 20. The fixing belt 20 is an example of a tube-like fixing member that extends in the axial direction. The fixing belt 20 is formed of, for example, a synthetic resin or the like having heat resistance and flexibility (elasticity).

(Retention Member)

As shown in FIG. 4, at both end portions of the fixing belt 20 in the left-right direction, a pair of retention members 24 are attached. Each of the retention members 24 includes a shaft-supporting portion 25 and a flange portion 26 which are integrally formed by a synthetic resin having heat resistance and abrasion resistance, for example.

It is noted that since the pair of retention members 24 generally have a bilaterally symmetric shape, one retention member 24 will mainly be described in descriptions below.

As shown in FIG. 5, the shaft-supporting portion 25 has a substantially C-shaped cross-sectional shape that is opened downwardly (a side of a pressure area N to be described later).

The shaft-supporting portion 25 is inserted inside from both ends of the fixing belt 20. The shaft-supporting portion 25 retains a portion of the fixing belt 20 excluding a bottom portion in a substantially arc shape (also see FIG. 4). The bottom portion of the fixing belt 20 forms a pressure area N. The pressure area N is positioned below the shaft-supporting portion 25. Moreover, the shaft-supporting portions 25 rotatably guide the both end portions of the fixing belt 20 in the axial direction about a shaft. The rotation about the shaft is a rotation about the axial direction.

As shown in FIG. 5 and FIG. 6, the flange portion 26 is formed to extend in a radial direction from an outer end portion of the shaft-supporting portion 25 in the axial direction. At an outer edge portion of the flange portion 26 excluding a lower edge, an insulation wall 26A is formed to extend toward an inner side of the axial direction (also see FIG. 4).

The insulation wall 26A is formed in a substantially rectangular cylindrical shape that is opened downwardly. The insulation wall 26A is provided so that a creepage distance from a substrate or the like disposed in the vicinity of the retention member 24 to the fixing belt 20 becomes sufficient. On both end surfaces of the flange portion 26 in the front-rear direction, insertion grooves 26B extending in the up-down direction are respectively provided (also see FIG. 4 and FIG. 6).

Further, an inner end surface of the flange portion 26 in the axial direction includes a restriction surface 27 with which the end portion of the fixing belt 20 is capable of coming into contact. Although details will be described later, the restriction surface 27 comes into contact with the end portion of the fixing belt 20 in the axial direction to restrict a movement of the fixing belt 20 in the axial direction.

As shown in FIG. 3, a supporting member 28 is provided inside the fixing belt 20. The supporting member 28 is formed of, for example, a metal material such as stainless steel. The supporting member 28 is formed in a substantially rectangular cylindrical shape elongated in the left-right direction.

The supporting member 28 is bridged between the shaft-supporting portions 25 of the pair of retention members 24. In addition, a heater holder 29 is fixed at a lower portion of the supporting member 28.

The heater holder 29 is formed of, for example, a synthetic resin having heat resistance and abrasion resistance. The heater holder 29 is formed in a substantially semicylindrical shape elongated in the left-right direction. The heater holder 29 is in contact with the inner circumferential surface of the fixing belt 20 on the lower side. The lower side of the fixing belt 20 is a side that opposes the pressure roller 21.

<Pressure Roller>

As shown in FIG. 2 and FIG. 3, the pressure roller 21 is formed in a substantially cylindrical shape elongated in the left-right direction. The pressure roller 21 is an example of a pressure member. The pressure roller 21 includes a core metal 21A formed of metal and an elastic layer 21B constituted of a silicon sponge or the like. The elastic layer 21B is laminated on an outer circumferential surface of the core metal 21A.

A driving motor M is connected to a left end portion of the core metal 21A via a gear train (not shown). The pressure roller 21 comes into contact with the fixing belt 20 from the lower side, and forms the pressure area N between the pressure roller 21 and the fixing belt 20.

It is noted that the pressure area N refers to an area where a pressure acts from the pressure roller 21 to the fixing belt 20.

<Heater>

As shown in FIG. 3, the heater 22 is formed in a substantially rectangular plate-like shape elongated in the left-right direction, and is fixed to a lower surface of the heater holder 29. The heater 22 includes a substrate and a heating resistor laminated on the substrate. The heating resistor generates heat by being energized.

The heating resistor of the heater 22 is in contact with the inner circumferential surface of the fixing belt 20 at a position corresponding to the pressure area N.

<Frame>

The frame 23 is formed of, for example, a metal material such as steel and stainless steel.

As shown in FIG. 2, the frame 23 is a box-like structure including a pair of side plates 30, first to third stays 31 to 33, and a connection plate 34. It is noted that since the pair of side plates 30 are generally bilaterally symmetric, one of the side plates 30 will mainly be described in descriptions below.

(Side Plates)

For example, the pair of side plates 30 are formed by a sheet metal bending process, and are formed substantially in an erected plate-like shape. The pair of side plates 30 are arranged opposed to each other in the left-right direction on both sides of the fixing belt 20 in the axial direction. The fixing belt 20 and pressure roller 21 described above are bridged between the pair of side plates 30.

As shown in FIG. 7, the side plate 30 includes a fitting groove 35 cut in from one end portion toward the other end portion in the up-down direction. In the example shown in FIG. 7, the fitting groove 35 is cut in downwardly from an upper end of the side plate 30.

The fitting groove 35 is formed between both ends of the side plate 30 in the front-rear direction. A portion of the side plate 30 on a rear side of the fitting groove 35 is formed to be higher than a portion of the side plate 30 on a front side of the fitting groove 35.

At the upper ends of the side plate 30 with the fitting groove 35 interposed therebetween, a front and rear pair of protrusions 36 are formed so as to protrude upwardly.

The fitting groove 35 is formed to be inclined downwardly from the front side toward the rear side. The direction from the front side toward the rear side is a direction from the upstream side of the passing direction toward the downstream side. The core metal 21A of the pressure roller 21 and the retention member 24 of the fixing belt 20 are fit into the fitting groove 35.

Specifically, an end portion of the core metal 21A is inserted into the fitting groove 35 from above to be rotatably supported about a shaft at a lower portion of the fitting groove 35. After the end portion of the core metal 21A is inserted into the fitting groove 35, the retention member 24 is inserted into the fitting groove 35.

Side edge portions 35A and 35B of the fitting groove 35 are inserted into the insertion grooves 26B of the retention member 24 (see FIG. 6). The fixing belt 20 is supported by the pair of side plates 30 via the pair of retention members 24 (see FIG. 2).

It is noted that each of the retention members 24 is pressed downwardly by an elastic member (not shown) such as a compression spring. Thus, the fixing belt 20 is retained in a state where it is in contact with the pressure roller 21.

(First to Third Stays)

The first to third stays 31 to 33 are formed by a sheet metal bending process, for example.

As shown in FIG. 2 and FIG. 7, the first to third stays 31 to 33 connect the pair of side plates 30 and retain a gap between the pair of side plates 30 constant. The first to third stays 31 to 33 are bridged between the pair of side plates 30. The second stay 32 is disposed on a rear side of the first stay 31, and the third stay 33 is disposed between the first stay 31 and the second stay 32 in the front-rear direction.

Specifically, the first stay 31 is provided more on the front side than the fitting groove 35 at the lower portion of the side plate 30. The second stay 32 is provided more on the rear side than the fitting groove 35 at the upper portion of the side plate 30. The third stay 33 is provided at a position apart from the lower end of the fitting groove 35 diagonally in a lower front direction.

It is noted that both end portions of the first to third stays 31 to 33 in the left-right direction are respectively fixed to the pair of side plates 30 by screws (not shown).

(Connection Plate)

As shown in FIG. 2, the connection plate 34 is formed in, for example, a crank shape including a pair of horizontal plate portions having different heights and a perpendicular plate portion connecting the pair of horizontal plate portions. The connection plate 34 is formed by, for example, a sheet metal bending process.

At both end portions of the pair of horizontal plate portions of the connection plate 34 in the left-right direction, a total of four engagement holes 37 are formed. By fitting the protrusions 36 of the pair of side plates 30 into the engagement holes 37, the connection plate 34 is bridged between one end portions of the pair of side plates 30 in the up-down direction. For example, the connection plate 34 is bridged between upper end portions of the pair of side plates 30.

It is noted that each of the engagement holes 37 is formed in a size that is large enough to loosely insert the protrusion 36. Moreover, while being bridged between the pair of side plates 30, the connection plate 34 is fixed to the pair of side plates 30 by screws (not shown).

It is noted that the frame 23 (for example, the second stay 32) is provided with a temperature sensor (not shown) for detecting a surface temperature of the fixing belt 20. For example, the temperature sensor is provided in the second stay 32. The driving motor M, the heater 22, the temperature sensor, and the like are electrically connected to the control apparatus of the image forming apparatus 1 via various driving circuits (not shown) to be controlled as appropriate by the control apparatus. [Action of fixing device]

Herein, fixing processing of the fixing device 7 will be described. The pressure roller 21 rotates upon receiving a driving force of the driving motor M, and the fixing belt 20 rotates by being driven by the pressure roller 21 (see the arrows of FIG. 3).

The heater 22 heats the fixing belt 20. The control apparatus receives a detection signal from the temperature sensor. The control apparatus causes the image forming apparatus 1 to execute the image forming processing while controlling the heater 22 such that a detected temperature maintains a preset temperature.

The sheet P onto which the toner image has been transferred enters the frame 23. The fixing belt 20 heats, while rotating, toner on the sheet P that passes through the pressure area N.

As the pressure roller 21 pressurizes, while rotating, the toner on the sheet P that passes through the pressure area N, the toner image is fixed onto the sheet P. Then, the sheet P onto which the toner image has been fixed is conveyed outside the frame 23 to be discharged to the sheet discharge tray 4.

[Leaning Force and Damage of Fixing Belt]

Incidentally, when the fixing belt 20 rotates upon receiving a uniform force in the left-right direction, a force of moving the fixing belt 20 in the left-right direction is not generated. Hereinafter, a force of moving the fixing belt 20 in the left-right direction will be referred to as a leaning force. When the leaning force is not generated, both ends of the fixing belt 20 in the left-right direction do not come into contact with the restriction surfaces 27 of the pair of retention members 24 (see the solid lines of FIG. 4).

However, when an outer diameter of the pressure roller 21 is not uniform or a bias force of a pair of elastic members that bias the pair of retention members 24 is not uniform, a difference in rotation speed of the fixing belt 20 is caused between the left side and the right side. In this case, a difference in conveying force is caused between the left side and the right side, and thus a leaning force acts on the fixing belt 20.

For example, the rotation speed on the left side may be higher than that on the right side (see the open arrows in solid lines in FIG. 4). In this case, the fixing belt 20 is in an attitude in which the left side thereof is tilted more toward the downstream side than the right side thereof (see the chain double-dashed lines of FIG. 4). Therefore, the left-side inner circumferential surface of the fixing belt 20 is guided by a portion of the shaft-supporting portion 25 on the upstream side, and the right-side inner circumferential surface of the fixing belt 20 is guided by a portion of the shaft-supporting portion 25 on the downstream side.

If a rotation direction F1 of the fixing belt 20 tilts with respect to a passing direction F0 of the sheet P, a component force F2 to move the fixing belt 20 toward a side having a higher rotation speed acts on the fixing belt 20. This component force F2 is the leaning force that moves the fixing belt 20 in the left-right direction (see the open arrow in the chain double-dashed line in FIG. 4).

In the example shown in FIG. 4, by the left end portion of the fixing belt 20 coming into contact with the restriction surface 27 of the retention member 24, the leftward movement of the fixing belt 20 is restricted (see the chain double-dashed lines of FIG. 4). At this time, as indicated by the chain double-dashed line of FIG. 5, the left-side inner circumferential surface of the fixing belt 20 is guided by the portion of the shaft-supporting portion 25 on the upstream side, and is set apart from the portion of the shaft-supporting portion 25 on the downstream side.

When the end portion of the fixing belt 20 comes into contact with the restriction surface 27 in the state where the inner circumferential surface of the fixing belt 20 is set apart from the shaft-supporting portion 25, the end portion of the fixing belt 20 may be bent or the like to be damaged.

[Attitude of Retention Members]

In this regard, in the fixing device 7 according to the present embodiment, the fitting grooves 35 of the pair of side plates 30 are formed such that a gap becomes larger on the downstream side of the pressure area N in the passing direction than on the upstream side. Thus, the pair of retention members 24 are arranged in a tilted attitude so as to be set apart from each other from the upstream side of the passing direction toward the downstream side. It is noted that the fitting grooves 35 of the pair of side plates 30 are an example of attachment portions to which the pair of retention members 24 are attached.

Figure 8:
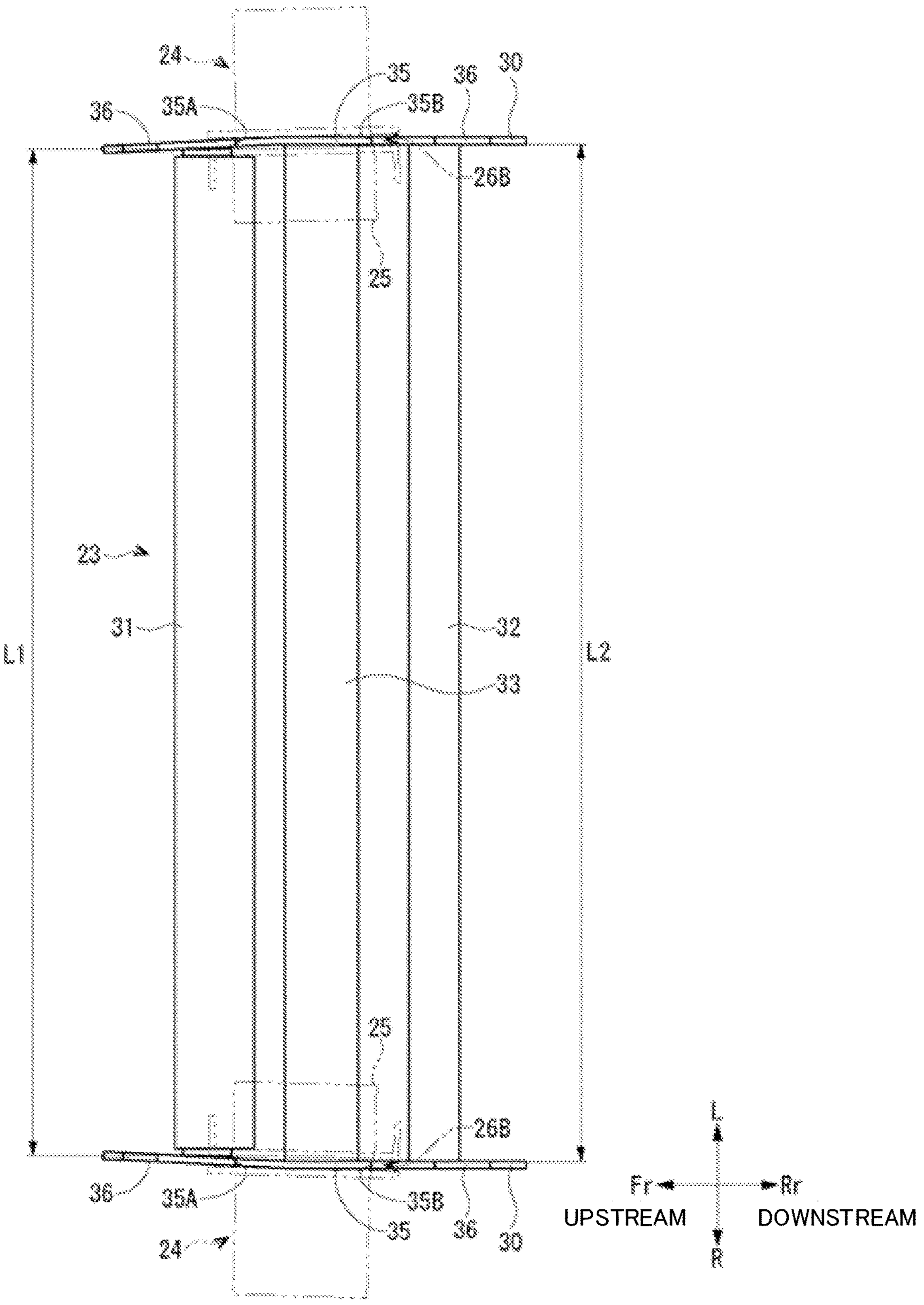
FIG. 8 is a plan view showing a frame of the fixing device according to the embodiment of the present disclosure.
Figure 9:
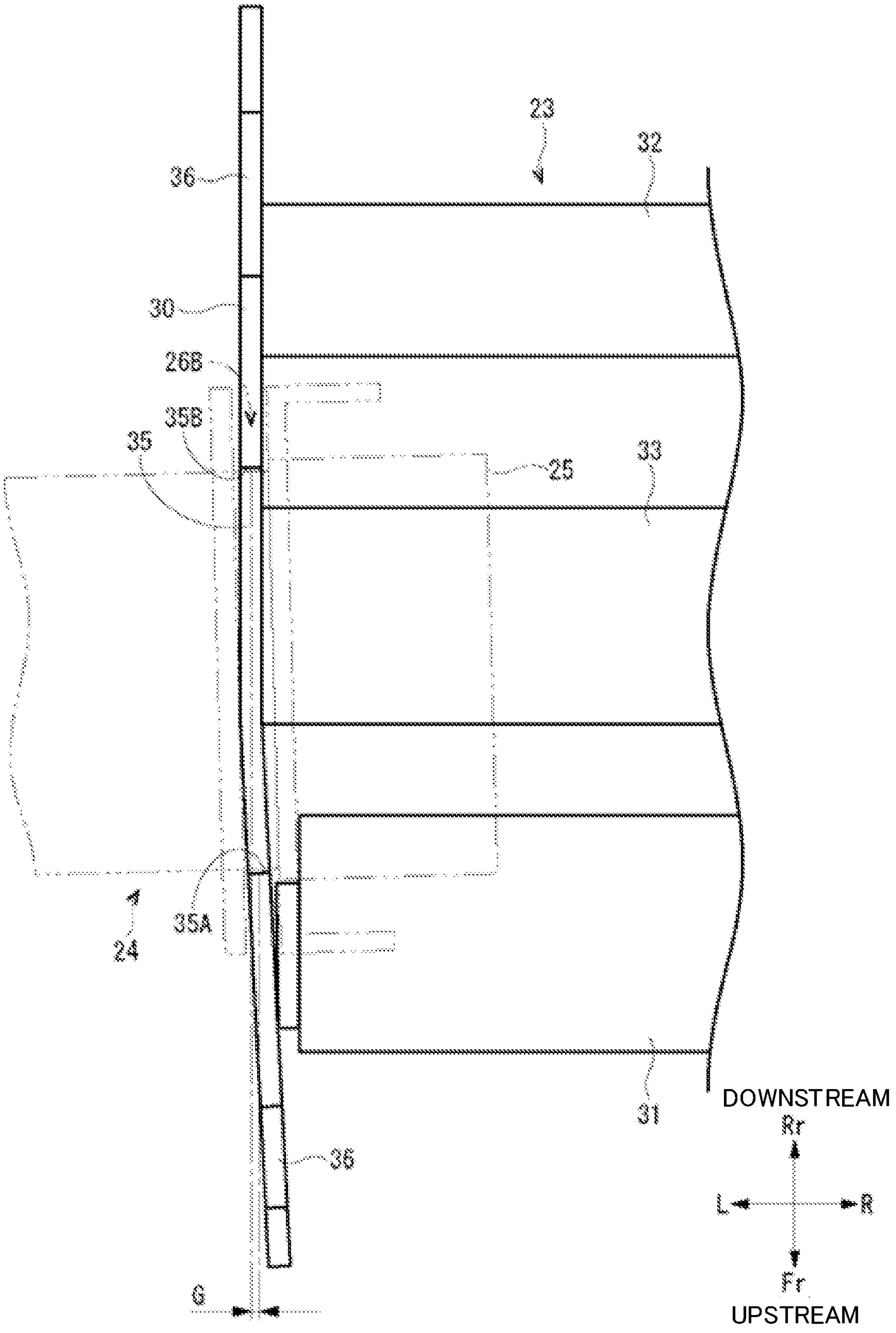
FIG. 9 is an enlarged plan view of a part of the frame of the fixing device according to the embodiment of the present disclosure.

Hereinafter, a structure for arranging the pair of retention members 24 in the tilted attitude will be specifically described with reference to FIG. 8 and FIG. 9. FIG. 8 is a plan view showing the frame 23. FIG. 9 is an enlarged plan view of a part of the frame 23.

As shown in FIG. 8, in the fixing device 7 according to the present embodiment, the second stay 32 of the frame 23 is formed to be longer than the first stay 31 in the axial direction.

A length L2 of the second stay 32 is, for example, about 0.5 to 2.0 mm longer than a length L1 of the first stay 31. In addition, the third stay 33 is formed to have the same length as the second stay 32.

When the pair of side plates 30 are fixed to the both end portions of the first to third stays 31 to 33 in the axial direction, upstream portions of the pair of side plates 30 tilt so as to be set apart from each other from the first stay 31 toward the third stay 33 in the axial direction. On the other hand, downstream portions of the pair of side plates 30 are formed to be substantially parallel.

The upstream portions are portions ranging from the first stay 31 to the third stay 33 in the pair of side plates 30. The downstream portions are portions ranging from the third stay 33 to the second stay 32 in the pair of side plates 30.

In other words, the upstream portions of the pair of side plates 30 from ends thereof on the upstream side of the passing direction to the upstream side edge portions 35A of the fitting grooves 35 are formed such that a gap therebetween gradually increases in the passing direction. On the other hand, the downstream portions of the pair of side plates 30 from the downstream side edge portions 35B of the fitting grooves 35 to ends thereof on the downstream side of the passing direction are formed with a constant gap. That is, the gap between the pair of side plates 30 on the downstream side is larger than the gap on the upstream side.

Further, as shown in FIG. 9, in each of the fitting grooves 35, the downstream side edge portion 35B is disposed at a position deviated more toward the outer side of the axial direction than the upstream side edge portion 35A.

It is noted that a positional deviation amount G between the downstream side edge portion 35B and the upstream side edge portion 35A is, for example, about 0.5 to 1.0 mm. In addition, a tilt angle of each of the retention members 24 is an angle small enough not to inhibit the rotation of the fixing belt 20. For example, the tilt angle of each of the retention members 24 is about 0.5 to 2 degrees.

In the fixing device 7 according to the present embodiment described above, the pair of retention members 24 are fit into the pair of fitting grooves 35 in which the downstream side edge portions 35B are deviated toward the outer side of the axial direction. Thus, the pair of retention members 24 are arranged in an attitude in which the retention members 24 are set apart from each other from the upstream side of the passing direction toward the downstream side (see FIG. 8 and FIG. 9).

With this configuration, the respective gaps between both ends of the fixing belt 20 in the axial direction and the pair of restriction surfaces 27 become larger on the downstream side of the passing direction than on the upstream side.

Therefore, even when the fixing belt 20 moves in the axial direction, it is difficult for the end portion of the fixing belt 20 to come into contact with the restriction surface 27 of the retention member 24 on the downstream side. Thus, the damage of the end portion of the fixing belt 20 in the axial direction can be suppressed.

Moreover, in the fixing device 7 according to the present embodiment, the first to third stays 31 to 33 are bridged between the pair of side plates 30 with gaps therebetween in the passing direction, to thus connect the pair of side plates 30.

Therefore, the frame 23 constitutes a generally box-like structure. This configuration can enhance rigidity of the frame 23 as compared to a case where the frame 23 is constituted only by the pair of side plates 30. Thus, the pair of side plates 30 and retention members 24 can be retained in an attitude in which the pair of side plates 30 and retention members 24 spread more on the downstream side of the passing direction than on the upstream side.

It is noted that in the fixing device 7 according to the present embodiment, the pair of side plates 30 tilt on the upstream side of the fitting grooves 35 in the passing direction and are substantially parallel on the downstream side of the fitting grooves 35 in the passing direction. However, the present disclosure is not limited to this.

For example, in the pair of side plates 30, only the portions near the fitting grooves 35 may be formed to tilt, and other portions on the upstream side and downstream side of the passing direction may be formed to be substantially parallel (not shown). The portions near the fitting grooves 35 in the pair of side plates 30 are portions at which the pair of retention members 24 are attached.

Further, for example, the pair of side plates 30 may entirely be arranged in a tilted attitude in which the pair of side plates 30 are set apart from each other from the upstream side toward the downstream side (not shown). In other words, at least the portions at which the pair of retention members 24 are attached in the pair of side plates 30 only need to be arranged such that the gap becomes larger on the downstream side of the passing direction than on the upstream side.

Furthermore, in the fixing device 7 according to the present embodiment, the connection plate 34 is bridged between the upper end portions of the pair of side plates 30. However, the present disclosure is not limited to this.

For example, the protrusions 36 may be formed at lower end portions of the pair of side plates 30, and the connection plate 34 may be bridged between the lower end portions of the pair of side plates 30 (not shown). It is noted that the connection plate 34 may be omitted (not shown).

Moreover, in the fixing device 7 according to the present embodiment, the second stay 32 is formed to be longer than the first stay 31, and the third stay 33 is formed to have the same length as the second stay 32. However, the present disclosure is not limited to this.

For example, the third stay 33 may be formed to be longer than the first stay 31, and the second stay 32 may be formed to be longer than the third stay 33 (not shown).

Modified Example

Figure 10:
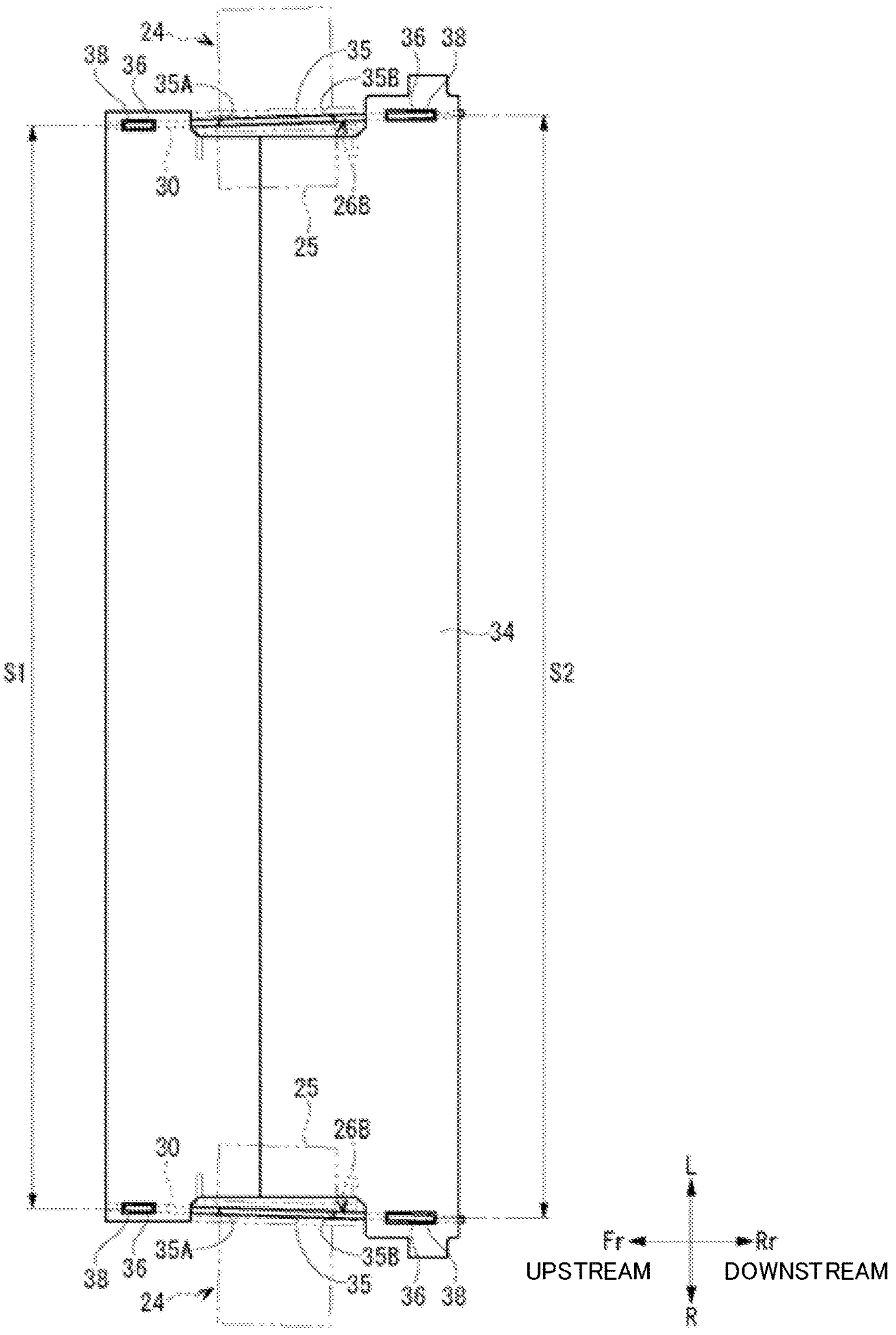
FIG. 10 is a plan view showing the frame of the fixing device according to a modified example of the embodiment of the present disclosure.

The fixing device 7 according to a modified example will be described with reference to FIG. 10. FIG. 10 is a plan view showing the frame 23 of the fixing device 7 according to the modified example. It is noted that in descriptions below, descriptions similar to those of the fixing device 7 described above are omitted.

In the fixing device 7 according to the modified example, the second and third stays 32 and 33 are formed to have the same length as the first stay 31, and positions of engagement holes 38 of the connection plate 34 differ between the upstream side and downstream side of the passing direction.

Specifically, of the four engagement holes 38, the left and right pair of engagement holes 38 positioned on the downstream side of the passing direction are formed at positions deviated more toward the outer side of the axial direction than the other left and right pair of engagement holes 38 positioned on the upstream side of the passing direction. In other words, a gap S2 between the pair of engagement holes 38 on the downstream side is larger than a gap S1 of the other pair of engagement holes 38 on the upstream side (S2>S1).

In the present modified example, the protrusions 36 are respectively inserted into the engagement holes 38 in a state where the portions of the pair of side plates 30 on the downstream side of the passing direction spread toward the outer side of the axial direction. Thus, the connection plate 34 is bridged between the upper end portions of the pair of side plates 30. Alternatively, the protrusions 36 may respectively be inserted into the engagement holes 38 in a state where the portions of the pair of side plates 30 on the upstream side of the passing direction are narrowed toward the inner side of the axial direction.

It is noted that the engagement holes 38 are formed small enough so as not to cause rattling of the inserted protrusions 36.

According to the present modified example, by bridging the connection plate 34 between the upper end portions of the pair of side plates 30, the gap between the pair of side plates 30 spreads more on the downstream side of the passing direction with respect to the fitting grooves 35 than on the upstream side.

Thus, the pair of retention members 24 can be arranged in a tilted attitude in which the retention members 24 are set apart from each other from the upstream side of the passing direction toward the downstream side. As a result, it becomes difficult for the end portions of the fixing belt 20 to come into contact with the restriction surfaces 27 of the retention members 24 on the downstream side, so effects similar to those of the fixing device 7 described above can be obtained.

It is noted that in the fixing device 7 according to the modified example, the first to third stays 31 to 33 are all formed with the same length. However, the present disclosure is not limited to this.

For example, similar to the fixing device 7 described above, the second and third stays 32 and 33 may be formed to be longer than the first stay 31 (not shown). Alternatively, the third stay 33 may be omitted (not shown).

It is noted that in the fixing device 7 according to the present embodiment including the modified example, the fitting groove 35 is cut in downwardly from the upper end of the side plate 30. However, the present disclosure is not limited to this.

For example, the fitting groove 35 may be cut in upwardly from the lower end of the side plate 30 (not shown).

Moreover, in the fixing device 7 according to the present embodiment, the protrusions 36 are inserted into the engagement holes 37 or 38, and the connection plate 34 is connected to the side plates 30 by screwing. However, the present disclosure is not limited to this.

For example, the protrusions 36 and the engagement holes 37 or 38 may be omitted, and the connection plate 34 may be connected to the side plates 30 by means such as bonding or welding (not shown).

In addition, in the fixing device 7 according to the present embodiment, the fixing belt 20 and the pressure roller 21 are supported by the fitting grooves 35. However, the present disclosure is not limited to this.

For example, the pressure roller 21 may be rotatably supported by the side plates 30 at positions different from the fitting grooves 35 (not shown).

Moreover, in the descriptions of the embodiment above, the case where the present disclosure is applied to a monochromatic image forming apparatus 1 has been described as an example. However, the present disclosure is not limited to this.

For example, the present disclosure may be applied to a color printer, a copying machine, a facsimile, a multifunction peripheral, or the like.

It is noted that the descriptions of the embodiment above merely describe an aspect of the fixing device and the image forming apparatus according to the present disclosure, and the technical scope of the present disclosure is not limited to the embodiment above. The present disclosure may be variously changed, substituted, or modified without departing from the gist of the technical idea of the present disclosure, and the scope of claims includes all embodiments that may fall within the scope of the technical idea.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A fixing device, comprising:

a fixing member which has flexibility, is formed in a cylindrical shape extending in an axial direction, and heats a toner image on a medium while rotating;

a pressure member which forms a pressure area between the pressure member and the fixing member while rotating, and pressurizes toner on the medium that passes through the pressure area;

a pair of retention members each including a shaft-supporting portion which rotatably guides one of both end portions of the fixing member in the axial direction, and a restriction surface which opposes the end portion of the fixing member in the axial direction and restricts a movement of the fixing member in the axial direction; and a frame including a pair of side plates to which the pair of retention members are attached and which rotatably support both end portions of the pressure member in the axial direction as well as support the fixing member via the pair of retention members, wherein at least portions of the pair of side plates at which the pair of retention members are attached are provided such that a gap between the pair of side plates becomes larger on a downstream side of a passing direction of the medium with respect to the pressure area than on an upstream side, and wherein the frame includes a first stay bridged between the pair of side plates on the upstream side of the passing direction with respect to the portions at which the pair of retention members are attached, and a second stay which is formed to be longer than the first stay in the axial direction, and is bridged between the pair of side plates on the downstream side of the passing direction with respect to the portions at which the pair of retention members are attached.

2. The fixing device according to claim 1, wherein the portions at which the pair of retention members are attached each include a fitting groove into which a corresponding one of the pair of retention members is fit, the fitting groove being cut in from one end portion toward another end portion in each of the pair of side plates in an up-down direction intersecting with the axial direction and the passing direction, the first stay is provided more on the upstream side of the passing direction than the fitting groove, and the second stay is provided more on the downstream side of the passing direction than the fitting groove.

3. An image forming apparatus, comprising:

an imaging device which forms a toner image on a medium; and the fixing device according to claim 1.

4. A fixing device comprising:

a fixing member which has flexibility, is formed in a cylindrical shape extending in an axial direction, and heats a toner image on a medium while rotating;

a pressure member which forms a pressure area between the pressure member and the fixing member while rotating, and pressurizes toner on the medium that passes through the pressure area;

a pair of retention members each including a shaft-supporting portion which rotatably guides one of both end portions of the fixing member in the axial direction, and a restriction surface which opposes the end portion of the fixing member in the axial direction and restricts a movement of the fixing member in the axial direction; and a frame including a pair of side plates to which the pair of retention members are attached and which rotatably support both end portions of the pressure member in the axial direction as well as support the fixing member via the pair of retention members, wherein at least portions of the pair of side plates at which the pair of retention members are attached are provided such that a gap between the pair of side plates becomes larger on a downstream side of a passing direction of the medium with respect to the pressure area than on an upstream side, and the portions at which the pair of retention members are attached each include a fitting groove into which a corresponding one of the pair of retention members is fit, the fitting groove being cut in from one end portion toward another end portion in each of the pair of side plates in an up-down direction intersecting with the axial direction and the passing direction, the frame includes a connection plate bridged between one end portions of the pair of side plates in the up-down direction, and the connection plate connects the pair of side plates such that the gap between the pair of side plates becomes larger on the downstream side of the passing direction with respect to the fitting groove than on the upstream side.

5. An image forming apparatus, comprising:

an imaging device which forms a toner image on a medium; and the fixing device according to claim 4.

* * * * *